United States Patent [19]

Cole et al.

[11] 4,089,441

[45] May 16, 1978

[54] PORTABLE MANUALLY OPERATED DUSTER

[76] Inventors: John M. Cole; Ruth E. Cole, both of 2715 Elmwood Ave., Sioux Falls, S. Dak. 57105

[21] Appl. No.: 689,132

[22] Filed: May 24, 1976

[51] Int. Cl.² .................... A01C 15/02; A01C 15/04; B05B 7/00

[52] U.S. Cl. ................................. 222/193; 239/654; 239/154

[58] Field of Search .............................. 239/152–154, 239/337, 652–655, 689; 222/193

[56] References Cited

U.S. PATENT DOCUMENTS

| | | | |
|---|---|---|---|
| 750,968 | 2/1904 | Haldeman | 239/654 |
| 916,728 | 3/1909 | Leggett | 239/653 |
| 1,752,956 | 4/1970 | Lex | 222/193 |
| 1,766,667 | 6/1930 | Miller | 239/152 X |
| 1,880,781 | 10/1932 | Cairns | 222/193 |
| 3,425,601 | 2/1969 | Fry | 222/193 |

FOREIGN PATENT DOCUMENTS

| | | | |
|---|---|---|---|
| 845,865 | 9/1939 | France | 239/654 |
| 435,184 | 2/1912 | France | 239/654 |
| 679,815 | 9/1952 | United Kingdom | 239/654 |

*Primary Examiner*—John J. Love
*Assistant Examiner*—Andres Kashnikow
*Attorney, Agent, or Firm*—Schroeder, Siegfried, Ryan, Vidas & Steffey

[57] ABSTRACT

A portable manually operated domestic-type duster having openings admitting air from behind into the side of its discharge flow adjacent the blower discharge and behind the discharge of the powder chamber to produce Venturi-type mixing action, and also having cooperative metering means in the form of a screen and a cylindrically-shaped wire agitator disposed across the discharge opening of the powder chamber, both the metering means and the blower being driven by single crank mechanism.

4 Claims, 5 Drawing Figures

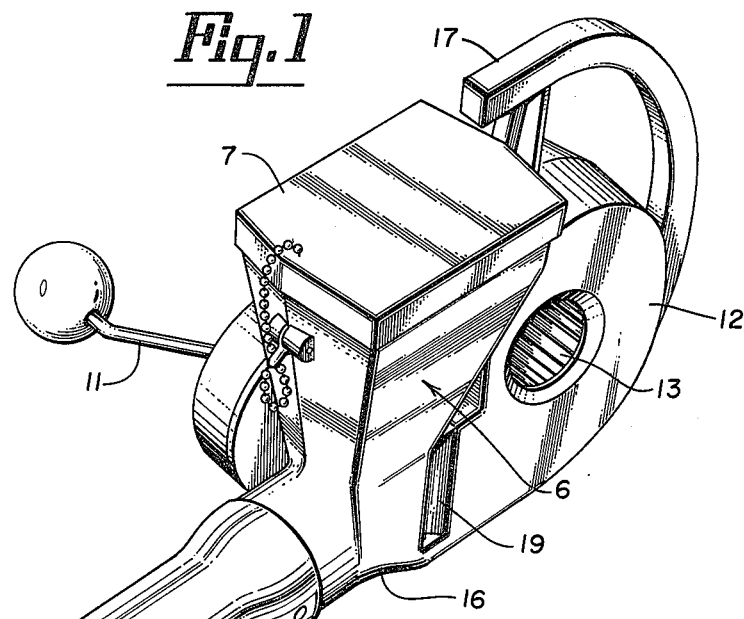
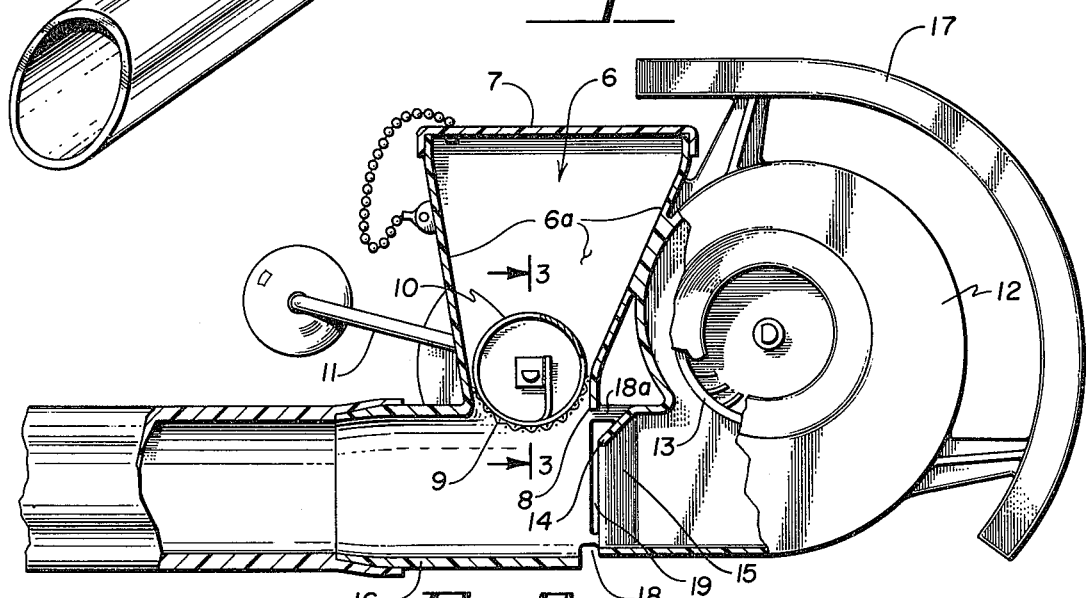
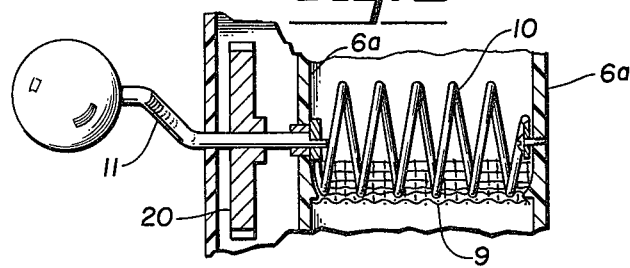

PORTABLE MANUALLY OPERATED DUSTER

It is a general object of our invention to provide a novel and improved portable, manually operated domestic-type duster providing an improved dusting performance.

A more specific object is to provide a novel and improved manual duster constructed and arranged to provide applications of powder in moderate and uniform amounts without undue waste.

Another object is to provide a novel and improved duster constructed and arranged to enable the user to apply a dusting powder without undue velocity and volumes of air.

Another object is to provide a novel and improved duster which may be operated without an undue waste of powder and which will mix the powder with the carrying air current in a uniform manner.

Another object is to provide a novel and improved duster constructed and arranged to effectively meter the dusting powder and introduce the same into a carrying air current in such a manner as to produce a uniform and consistent application while utilizing a minimum of dusting powder.

Another object is to provide a novel and improved duster constructed and arranged to create a Venturi action immediately adjacent the discharge of the powder chamber to provide a more uniform mixing and application of the powder.

Another object is to provide a novel and improved duster constructed and arranged to produce a continuous flow of powder having a uniform particle size that can be readily handled by the air stream.

These and other objects and advantages of our invention will more fully appear from the following description, made in connection with the accompanying drawings, wherein like reference characters refer to the same or similar parts throughout the several views, in which:

FIG. 1 is a perspective view of one embodiment of our invention;

FIG. 2 is a side elevation of the same with portions cut away to show internal details;

FIG. 3 is a fragmentary, vertical section taken along line 3—3 of FIG. 2 and showing the spirally extending cylindrical wire agitator in elevation;

Figure 4:
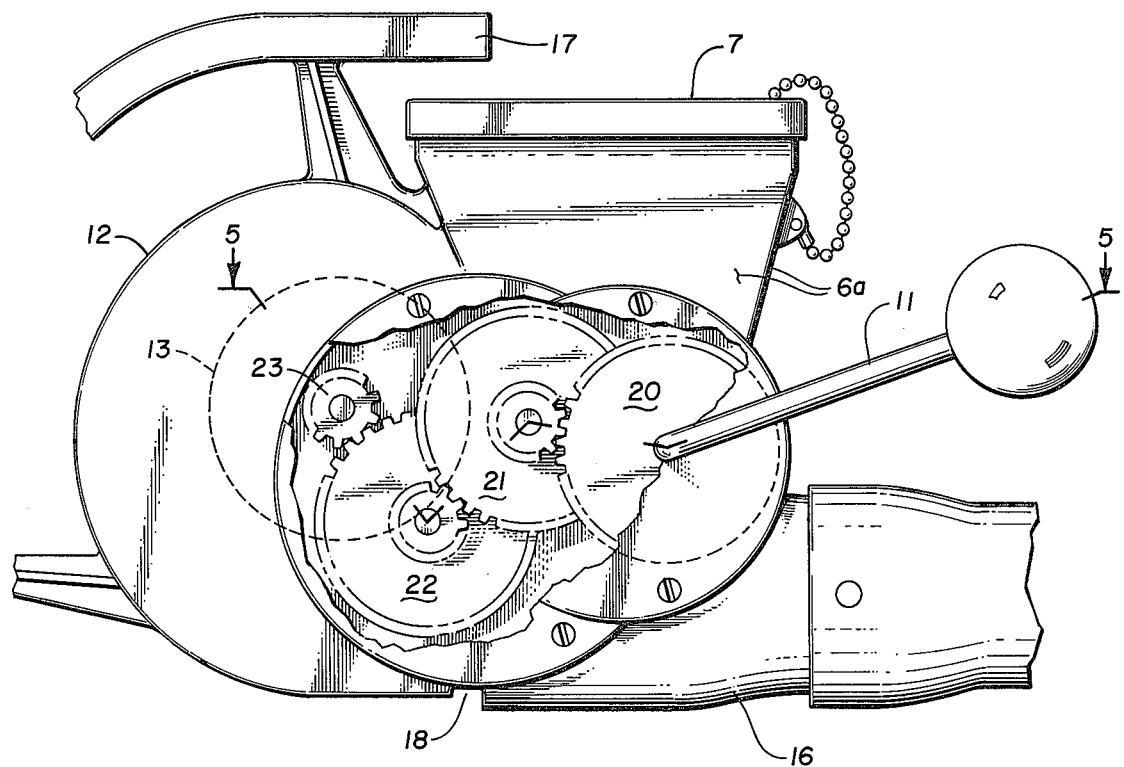
FIG. 4 is a side elevation on a slightly enlarged scale taken from the opposite side of that shown in FIGS. 1 and 2 and with a portion of the housing broken away to show the driving gear mechanism connected to the crank.

One embodiment of our invention, as shown in FIGS. 1-5, includes chamber structure 6 having upright walls and a cover member 7 and adapted to receive and contain powdered material such as is utilized in dusting plants. As shown, the side walls of the chamber 6 are upstanding and define the discharge opening 8 at their lower end. Secured to the side walls of the chamber 6 and extending across the discharge opening 8 is a wire screen panel 9 which is concavely shaped to adapt the same to cooperate with a generally cylindrically shaped, spirally extending wire agitator 10. This agitator 10, as best shown in FIG. 3, engages the upper surface of the screen panel 9 and cooperatively agitates the powdered material and tends to move the material along its axis and to agitate the same to provide a uniform flow thereof through the openings of the screen 9. As best shown in FIG. 3, the agitatpr 10 is rotatably mounted in the side walls of the chamber 6 and is connected in driving relation to a crank member 11 which is likewise rotatably mounted in one side wall 6a of the chamber 6.

Connected to the chamber structure 6 and carried thereby is a blower housing 12 within which a blower 13 is rotatably mounted. The blower housing 12 has an air discharge 14 which is defined by converging wall structure 15 which directs the air flow from the blower forwardly and directly below the discharge opening 8 of the chamber 6. It will be noted that the blower discharge opening 14 is relatively restricted as compared to the discharge conduit 16 which is connected to the discharge opening 8 of the chamber structure so that as the air is released through the discharge opening 14, it is permitted to expand. A handle member 17 is connected to the blower housing 12 to facilitate handling the entire mechanism.

The discharge conduit 16 is provided with a plurality of air admission openings, one 18 of which is disposed immediately adjacent and below the discharge opening 14 and the other 18a of which is located immediately above the discharge opening 14. It will be noted that each of these air admission openings are positioned behind and below the discharge opening 8 of the chamber 6. A pair of similar openings, such as are indicated by the numeral 19, is provided at each side of the blower discharge opening 14 so that free air is permitted to enter the discharge conduit 16 thereat. The entrance of air through said openings is accomplished by the Venturi action created by the rapidly moving air current generated by the blower 13 and discharged through the opening 14 and the location of the air admission openings just described.

Figure 5:
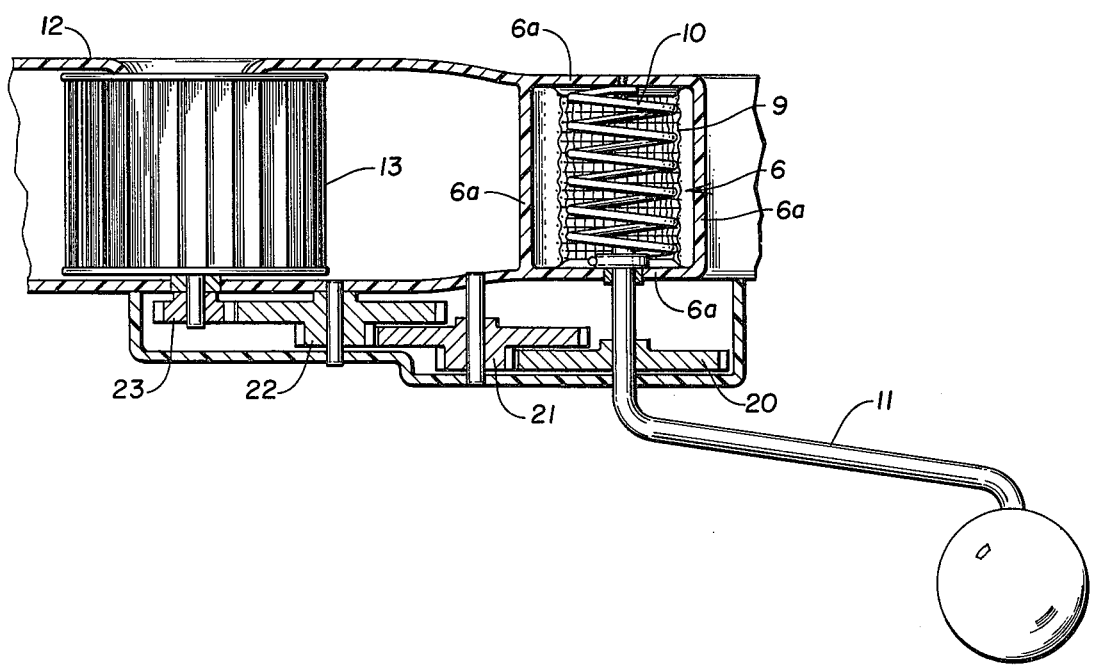
FIG. 5 is a fragmentary section taken along line 5—5 of FIG. 4.

As best shown in FIGS. 4 and 5, a plurality of gears 20, 21, 22 and 23 are rotatably mounted upon the housing 12 of the blower 13 and upon the chamber structure 6 to provide a gear train by means of which operation of the crank 11 will drive the blower 13 at a stepped-up speed. Thus, the gear member 20 is keyed to the crank 11 and, in turn, drives the gears 21, 22 and 23 to drive the blower 13 as desired.

In operation, the operator of the device carries the entire mechanism which, as can be seen, is simple, light and inexpensive in construction by grasping the handle 17 with the left hand and operating the crank 11 with the right hand to cause the blower 13 to be operated and discharge a strong flow of air outwardly through the discharge outlet 14 immediately below discharge opening 8 of the chamber 6. At the same time, the crank 11 causes the wire agitator 10 to rotate while in contact with the concave upper surface of the screen panel 9 to induce a metered flow of uniformly sized particles through the screen and drop the same into the air stream emitted by the blower. The rapid flow of air from the relatively restricted opening 14 into the discharge conduit 16 draws air through the openings 18, 18a and 19 from the free atmosphere into the discharge conduit 16 and causes the same to mix therewith and with the powder which drops through the screen 9. Thus, the air is permitted to expand and mixing is induced through the introduction of outside air immediately below the discharge of the chamber 6. This expansion and mixing action enables the operator to ensure a uniform distribution of the powder in volumes and at velocities which are under relative control as compared to other plant dusters heretofore known. As a result, the uniform and controlled flow of the powder can be effected without undue loss or waste thereof and without application of the powder over an unduly large area.

It will be noted that the action of the wire agitator 10 precludes bridging and ensures a continuous and uniform introduction of the powder into the air stream directly therebelow. In addition, the metering agitator 10 continuously mixes the powder immediately above the screen so as to prevent separation of pre-mixed materials. The air stream created by the blower provides more than an adequate velocity to carry the metered powder through the discharge tube and onto the area to be treated, even though additional air is introduced to the openings 18, 18*a* and 19 and the air is permitted to expand in the discharge conduit 16.

The Venturi action described hereinbefore increases the volume of air without increasing the velocity and creates reduced pressure immediately below the screen 9, thereby preventing back surges or belching of air through the powder in the supply chamber 6 and facilitating the introduction of outside air through the openings 18, 18*a* and 19. The mixing action which takes place is a result of such introduction of additional air and expansion and ensures better entrainment of the particles of powder and a more uniform distribution thereof in the air flow, thus providing better control and a more uniform application of the powder.

It will, of course, be understood that various changes may be made in the form, details, arrangement and proportions of the parts without departing from the scope of our invention which consists of the matter shown and described herein and set forth in the appended claims.

What we claim is:

1. A portable manually operated domestic type duster comprising:

(a) a chamber structure adapted to receive and contain a supply of powdered material therein and having a discharge opening in the lower portion thereof;

(b) a discharge conduit connected to the discharge opening of said chamber structure in powder-receiving relation and directing the same outwardly in a predetermined direction therefrom;

(c) blower means connected to said chamber structure and having a relatively restricted air discharge connected to said discharge conduit immediately adjacent to and behind the discharge of said chamber structure and directing air past and away therefrom;

(d) a concave wire screen panel secured to said chamber structure and extending across the discharge opening thereof;

(e) a cylindrically shaped spirally extending wire agitator mounted for rotation within said chamber structure above and across said screen material and in engagement with the upper concave surface thereof;

(f) manual crank means rotatably mounted on said chamber structure and drivingly connected to said agitator and said blower means for rotating the same whereby upon operation thereof, powdered material will be metered into the air flow directed outwardly through said discharge conduit by said blower means and distributed thereby; and (g) said discharge conduit having air-admission openings therein located between said discharge opening of said chamber structure and said air discharge of said blower means.

2. A portable manually operated domestic-type duster comprising:

(a) chamber structure adapted to receive and contain a supply of powdered material therein and having a discharge opening in the lower portion thereof;

(b) a discharge conduit connected to the discharge opening of said chamber structure in powder-receiving relation and directing the same outwardly in a predetermined direction therefrom;

(c) rotary blower means connected to said chamber structure and having a relatively restricted air discharge connected to said discharge conduit, the point of discharge of air from said blower means being disposed immediately adjacent to and behind the discharge of said chamber structure and directing air past and away therefrom;

(d) rotary metering means extending across the discharge opening of said chamber structure for metering powdered material from the interior of said chamber structure through its discharge opening into said discharge conduit above and ahead of the minimum dimensions of said blower discharge;

(e) said discharge conduit having air-admission openings therein adjacent the air discharge of said blower means and bringing the interior of said discharge conduit into fluid communication with the free atmosphere and admitting air thereinto adjacent said discharge of said chamber structure;

(f) manual crank means connected to said blower means and said metering means and constructed and arranged for simultaneously driving said blower means and said metering means whereby upon operation thereof, powdered material will be metered into the air flow directed outwardly through said discharge conduit by said blower means and free air will be drawn into said discharge conduit and thoroughly mixed with such powdered material and the air discharged by said blower means before such powdered material and air are discharged from said discharge conduit; and (g) said air-admission openings in said discharge conduit being located between said rotary blower means discharge and the discharge opening of said chamber structure to cause said blower means to create a Venturi action whereby air is drawn through said air-admission openings into the air flow discharged by said blower means past the discharge of said chamber structure to facilitate the even discharge and distribution of powdered material outwardly through said discharge conduit.

3. A portable manually operated domestic-type duster comprising:

(a) chamber structure adapted to receive and contain a supply of powdered material therein and having a discharge opening in the lower portion thereof;

(b) a discharge conduit connected to the discharge opening of said chamber structure in powder-receiving relation and directing the same outwardly in a predetermined direction therefrom;

(c) rotary blower means connected to said chamber structure and having a relatively restricted air discharge connected to said discharge conduit, the point of discharge of air from said blower means being disposed immediately adjacent to and behind the discharge of said chamber structure and directing the air past and away therefrom;

(d) rotary metering means extending across the discharge opening of said chamber structure for metering powdered material from the interior of said chamber structure through its discharge opening into said discharge conduit above and ahead of the minimum dimensions of said blower discharge;

(e) said discharge conduit having air-admission openings therein adjacent the air discharge of said blower means and bringing the interior of said discharge conduit into fluid communication with the free atmosphere and admitting air thereinto adjacent said discharge of said chamber structure;

(f) manual crank means connected to said blower means and said metering means and constructed and arranged for simultaneously driving said blower means and said metering means whereby upon operation thereof, powdered material will be metered into the air flow directed outwardly through said discharge conduit by said blower means and free air will be drawn into said discharge conduit and thoroughly mixed with such powdered material and the air discharged by said blower means before such powdered material and air are discharged from said discharge conduit; and (g) said air-admission openings in said discharge conduit being located in substantially the same vertical plane as the portion of the discharge of said blower means having minimum dimensions and as a portion of said chamber structure which defines its said discharge opening.

4. A portable manually operated domestic-type duster comprising:

(a) chamber structure adapted to receive and contain a supply of powdered material therein and having a discharge opening in the lower portion thereof;

(b) a discharge conduit connected to the discharge opening of said chamber structure in powder-receiving relation and directing the same outwardly in a predetermined direction therefrom;

(c) rotary blower means connected to said chamber structure and having a relatively restricted air discharge connected to said discharge conduit, the point of discharge of air from said blower means being disposed immediately adjacent to and behind the discharge of said chamber structure and directing the air past and away therefrom;

(d) rotary metering means extending across the discharge opening of said chamber structure for metering powdered material from the interior of said chamber structure through its discharge opening into said discharge conduit above and ahead of the minimum dimensions of said blower discharge;

(e) said discharge conduit having air-admission openings therein adjacent the air discharge of said blower means and bringing the interior of said discharge conduit into fluid communication with the free atmosphere and admitting air thereinto adjacent said discharge of said chamber structure;

(f) manual crank means connected to said blower means and said metering means and constructed and arranged for simultaneously driving said blower means and said metering means whereby upon operation thereof, powdered material will be metered into the air flow directed outwardly through said discharge conduit by said blower means and free air will be drawn into said discharge conduit and thoroughly mixed with such powdered material and the air discharged by said blower means before such powdered material and air are discharged from said discharge conduit; and (g) at least one of said air-admission openings in said discharge conduit and the portion of the discharge of said blower means having its minimum dimensions located in substantially the same transverse plane relative to the said blower discharge as a portion of said chamber structure which defines its said discharge opening.

* * * * *